(12) United States Patent
Herzog et al.

(10) Patent No.: US 12,540,635 B2
(45) Date of Patent: Feb. 3, 2026

(54) CONNECTING ELEMENT AND CONNECTING ARRANGEMENT

(71) Applicant: Brose Fahrzeugteile SE & Co. Kommanditgesellschaft, Bamberg, Bamberg (DE)

(72) Inventors: Hans Herzog, Strullendorf (DE); Norman Huemmer, Ebensfeld (DE); Michael Jahn, Bad Staffelstein (DE); Uwe Rausch, Tambach-Dietharz (DE); Daniel Spindler, Friedrichroda (DE); Manuel Stoebe, Finsterbergen (DE); Jan Stoetzer, Tambach-Dietharz (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 778 days.

(21) Appl. No.: 17/861,443

(22) Filed: Jul. 11, 2022

(65) Prior Publication Data
US 2022/0341448 A1 Oct. 27, 2022

Related U.S. Application Data

(63) Continuation of application No. PCT/EP2020/087596, filed on Dec. 22, 2020.

(30) Foreign Application Priority Data

| Jan. 10, 2020 | (DE) | 10 2020 200 253.3 |
| Mar. 25, 2020 | (DE) | 10 2020 203 872.4 |
| May 19, 2020 | (DE) | 10 2020 113 588.2 |

(51) Int. Cl.
*F16B 21/02* (2006.01)
*F16B 5/06* (2006.01)
*F16B 5/10* (2006.01)

(52) U.S. Cl.
CPC ............. *F16B 5/0642* (2013.01); *F16B 5/10* (2013.01); *F16B 21/02* (2013.01)

(58) Field of Classification Search
CPC .......... F16B 5/10; F16B 5/0642; F16B 21/04; F16B 21/02
See application file for complete search history.

(56) References Cited

U.S. PATENT DOCUMENTS

| 5,368,427 A | 11/1994 | Pfaffinger |
| 5,707,190 A | 1/1998 | Hiraguri et al. |

(Continued)

FOREIGN PATENT DOCUMENTS

| CN | 104704278 A | 6/2015 |
| CN | 105264241 A | 1/2016 |

(Continued)

*Primary Examiner* — Michael P Ferguson
(74) *Attorney, Agent, or Firm* — Laurence A. Greenberg; Werner H. Stemer; Ralph E. Locher (57) ABSTRACT

A connecting element for mechanically connecting at least two components has a closure head for abutment against a first component and having a closure foot for abutment against a second component and for bracing the latter against the first component in a rotated final-mounting position. A stem portion extends between the closure head and the closure foot, which is spaced apart axially from the closure head in the longitudinal direction of the stem. The closure head has a sealing surface that extends in the longitudinal direction of the stem portion and sealingly abuts against a corresponding sealing surface of a recess in the first component. There is also described a connecting arrangement with a first component and at least one second component and a corresponding connecting element. The latter may be made from a single material component.

10 Claims, 9 Drawing Sheets

(56) References Cited

U.S. PATENT DOCUMENTS

| | | |
|---|---|---|
| 7,596,858 B2 | 10/2009 | Opper |
| 7,955,038 B2 | 6/2011 | Silbereisen et al. |
| 8,262,333 B2 | 9/2012 | Buecker et al. |
| 10,514,116 B2 | 12/2019 | Bottcher et al. |
| 10,933,817 B2 | 3/2021 | Leverger et al. |
| 11,041,520 B2 | 6/2021 | Sbongk |
| 2016/0040705 A1 | 2/2016 | Peter et al. |
| 2017/0335880 A1 | 11/2017 | Prevost |
| 2019/0032696 A1 | 1/2019 | Sbongk |
| 2019/0113063 A1 | 4/2019 | Meiffre et al. |
| 2019/0118731 A1 | 4/2019 | Leverger et al. |

FOREIGN PATENT DOCUMENTS

| | | |
|---|---|---|
| CN | 110168235 A | 8/2019 |
| DE | 102013006720 A1 | 10/2014 |
| DE | 102017117002 A1 | 1/2019 |
| EP | 3425216 A1 | 1/2019 |
| WO | 2004022260 A1 | 3/2004 |
| WO | 2007128375 A1 | 11/2007 |
| WO | 2008101531 A1 | 8/2008 |

CONNECTING ELEMENT AND CONNECTING ARRANGEMENT

CROSS-REFERENCE TO RELATED APPLICATION

This application is a continuation, under 35 U.S.C. § 120, of copending International Patent Application PCT/EP2020/087596, filed Dec. 22, 2020, which designated the United States; this application also claims the priority, under 35 U.S.C. § 119, of German Patent Applications DE 10 2020 200 253.3, filed Jan. 10, 2020; DE 10 2020 203 872.4, filed Mar. 25, 2020; and DE 10 2020 113 588.2, filed May 19, 2020; the prior applications are herewith incorporated by reference in their entirety.

FIELD AND BACKGROUND OF THE INVENTION

The present invention relates to a connecting element for the mechanical connection of at least two components, in particular two components of a motor vehicle door. The invention furthermore relates to a connecting arrangement or module with such a connecting element.

A connecting element of this type is used in particular for mechanically connecting two sheet-like components, for example an inside door panel or body part of a motor vehicle to a function carrier or unit carrier. In this connection, at least two plate-like components are connected to one another by means of a quick-acting closure such that, for example, the assemblies of motor vehicle doors can be mounted in a manner saving time.

For this purpose, commonly assigned U.S. Pat. No. 8,262,333 B2 and its counterpart, published international application WO 2008/101531 A1, disclose a connecting element for mechanically connecting at least two components, in particular two components of a motor vehicle door, and a connecting arrangement with at least one first and one second component and with such a connecting element. The connecting element has an abutment collar for abutment against a first component and a transverse lock and also a stem portion carrying the latter and intended for rotatably passing through corresponding apertures in the components. The transverse lock has abutment flanks for abutment against a second component and for bracing the latter against the first component in a rotated final installation position. In the connecting arrangement, the connecting element in a final installation position reaches through the axially aligned apertures of the first component and of the second component and is rotated from an angular insertion position into an angular end position in order to produce the connection. If the connecting element is held in a preassembly position on the first component, the transverse lock is located in the passage opening.

U.S. Pat. No. 7,955,038 B2 and its counterpart, published international application WO 2007/128375 A1, disclose a rotary closure which connects two components to one another. The rotary closure has a sealing lip which presses in an axially sealing manner against a flat cover plate.

SUMMARY OF THE INVENTION

It is accordingly an object of the invention to provide a connecting element which overcomes the above-mentioned and other disadvantages of the heretofore-known devices and methods of this general type and which provides for a particularly suitable connecting element for the mechanical connection of at least two components, in particular two components of a motor vehicle door or the like. In particular, the intention is for the connecting element to be able to be produced simply. The intention here is for a suitable seal to be provided between the connecting element and a first of the components. Furthermore, the intention is for a suitable module arrangement or connecting arrangement with such a connecting element and at least one first component to be specified. In particular, the intention is to specify an extensively sealing, simply producible and re-releasable connection between two components, namely a carrier (function or unit carrier) and a body part or inside door panel.

With the above and other objects in view there is provided, in accordance with the invention, a connecting element for mechanically connecting at least two components, the connecting element comprising:

a closure head for abutment against a first component;

a closure foot for abutment against a second component and for bracing the second component against the first component in a rotated final installation position of the connecting element;

a stem portion extending between said closure head and said closure foot, wherein said closure foot is axially spaced apart from said closure head in a longitudinal direction of said stem portion;

said closure head being frustoconical with a sealing surface tapering towards said closure foot and extending in a longitudinal direction of said stem portion, for sealing abutment against a corresponding sealing surface of a recess formed in the first component.

In other words, the connecting element is provided and designed for the mechanical connection of at least two components, in particular two components of a motor vehicle door, preferably a carrier and a further component. The connecting element has a closure head, also referred to below as an abutment, for abutting against a first component, in particular against the carrier, and a closure foot, also referred to below as transverse lock, for abutment against the second component and for bracing the latter against the first component in a rotated final installation position. A stem, or shaft, extends between the closure head and the closure foot, which is spaced apart axially from the closure head in the longitudinal direction of the stem.

The closure head has a lateral surface or abutment surface extending axially, i.e., in the longitudinal direction of the stem portion, as a sealing surface for sealing abutment against a corresponding sealing surface of a recess of the first component. In other words, the closure head is designed for sealing abutment against a counter surface of the first component or of the carrier. Particularly advantageously, the closure head (abutment collar) of the connecting element, which is advantageously a connecting component in the manner of a quarter-turn fastener or quick-acting closure, is formed frustoconically with a sealing surface tapering towards the closure foot. In other words, the closure head has a sealing surface in the form of a cone envelope section. The closure foot (transverse lock) is suitably helical or helically curved, i.e., it has a certain pitch.

Expediently, this connecting element with the closure head (abutment collar) and its sealing surface and with the transverse lock and with the stem portion is a single-component plastics component (1C component).

In an advantageous refinement, the closure head has an annular space with radial inner struts. In addition, the stem portion is designed as a hollow body with a closed stem foot at the stem end opposite the closure head. By means of each of these measures, the connecting element can be produced in a particularly material- and weight-saving manner.

According to an expedient development, the closure foot (transverse lock) of the connecting element is provided and designed for rotatably passing through corresponding passage openings (apertures) in the components. In other words, the passage openings in the components, on the one hand, and the closure foot, on the other hand, are designed in such a manner that the connecting element can be plugged with its closure foot through the passage openings and subsequently rotated in order to brace the components against one another and to produce a secure connection between them.

For this purpose, the closure foot suitably has two diametric lock arms which run radially with respect to the longitudinal axis of the stem portion. A lock arm or lock arms is or are also understood as meaning a thread-like (thread-turn-like) or profiled notch in the stem or stem portion. The lock arms have lock flanks running in a V-shaped or wedge-shaped manner with respect to one another, with a lock apex connecting the lock flanks facing the closure head. By said, preferably mutually diametrically opposite, lock arms, the closure foot passes to the second component and is in abutment there in particular against the rear-side wall or opening edge of the corresponding passage opening.

In an expedient development, one of the lock flanks of at least one of the lock arms runs parallel to the longitudinal axis of the stem while the other lock flank of said lock arm runs at an angle (wedge angle) obliquely with respect to the longitudinal axis of the stem. This angle is suitably (50±10°). The preferred angle is 45°. The lock flank, running parallel to the longitudinal axis of the shaft, of the one lock arm is suitably arranged opposite the lock flank, running obliquely with respect to the longitudinal axis of the stem, of the other lock arm.

By rotation of the connecting element, the two components are braced against one another with the desired sealing of the closure head (abutment collar) on the first component, in its recess receiving the closure head, being produced. The sealing surfaces of the closure head and of the first component form a pair of sealing surfaces here.

In an advantageous refinement, at least one, in particular rib-shaped or web-shaped, stop element is provided which is provided along the connecting element, preferably on the closure head (abutment collar), and is suitably integrally formed thereon. Additionally or alternatively, at least one securing cam is suitably provided which is preferably provided on the closure head (abutment collar) and/or is integrally formed thereon. In addition, the abutment collar of the connecting element expediently has a tool drive. For this purpose, a tool holder, in particular a polygonal socket or multilobular socket, preferably a hexagon socket or hexalobular socket, is suitably provided on the attachment collar of the connecting element.

The stop element protrudes preferably radially and, for example, also axially over the closure head and can firstly serve for manual handling of the connecting element during the preassembly thereof on the first component. In particular, the stop element serves for limiting the rotational movement of the connecting element in the final installation position thereof. In the final installation position, when the two components are braced against one another by means of the connecting element, the stop element passes onto a corresponding stop edge of the first component, preferably in the region of the receptacle thereof for the closure head. The securing cam serves for securing the connecting element in the final installation position thereof in order to prevent reverse rotation of the connecting element, which has been twisted or rotated into said position, and therefore release, in particular from the first component.

The module arrangement or connecting arrangement referred to below merely as connecting arrangement comprises at least one first component and one second component, and also such a connecting element, wherein the components have a respective passage opening (an aperture). In a preassembly position, the closure foot (transverse lock) of the connecting element is located in the passage opening of the first component, and the closure head (abutment collar) is located in the corresponding recess of the first component. The connecting element here is advantageously releasably latched in the preassembly position to the closure foot by means of corresponding joining and latching elements, on the one hand, and by way of the passage opening, on the other hand, to the first component, preferably in the passage opening thereof. In other words, axial preliminary latching takes place in the function carrier and therefore in the first component, and therefore the latter or the function carrier can be mounted together with the connecting element as an assembly onto the body part as the second component.

The joining or latching element on the closure-foot side is suitably provided on the lock flank, which runs parallel to the longitudinal axis of the stem, of the closure foot. The closure head suitably has a perimeter wall or encircling skirt with radial elasticity. The head expediently has a circumferentially located latching structure, and therefore the latter, after latching, lies between the head (closure head) of the connecting element and the function carrier as the first component. As a result, an inadvertent reverse rotation of the head is prevented.

In a final installation position, the connecting element reaches with its closure foot (transverse lock) of the connecting element through the passage opening of the first component and through the axially aligned passage openings (apertures) of both components and is rotated from an angular insertion position (preassembly position) into an angular end position (final installation position) in order to produce the connection.

In the angular end position, between the preferably conical or frustoconical abutment surface as sealing surface of the closure head and an alternatively or preferably likewise conical or frustoconical mating surface as corresponding sealing surface of an inner wall of a recess of the first component for the closure head, a pair of sealing surfaces is formed between the connecting element and the first component. The sealing surfaces of the closure head and of the first component form a pair of sealing surfaces here, wherein the cone-shaped or frustoconical or conical abutment surface can be provided as the sealing surface on the closure head and/or on the inner wall of the recess of the first component or (function) carrier, in particular in the form of a conical cup or such a cup with a conically running side wall.

For reliable sealing of the connecting element in relation not the first component, a sufficient surface pressure is produced here between the, in particular frustoconical, abutment surface as the sealing surface of the closure head (abutment collar) and the mating surface of the first component via the, preferably helical, closure foot of the connecting element. The counter surface of the first component can be, for example, likewise frustoconical. Also, either the counter surface of the first component or the abutment surface as the sealing surface of the closure head can be frustoconical.

In one embodiment of the connecting arrangement, the latter comprises at least one function carrier and a body part and also a connecting element via which the body part is connected to the function carrier, which is preferably composed of plastic, wherein the connecting element has holding structures at its first end and the body part has an aperture through which the first end of the connecting element in an introduction position can be passed together with its holding structures in a connecting direction, and wherein, after rotation about an angle of rotation, the holding structures interlock in a closed position against the body part.

The function carrier has an aperture (passage opening, recess) and a conical cup, which is in particular concentric to said aperture and is also referred to below as a recess, with a conically running abutment wall or side wall and with a base surface in which the passage opening is made in the function carrier, wherein the connecting element has a closure head with a perimeter wall, which is also referred to below as a skirt, and wherein the perimeter wall, following rotation of the connecting element into a closed position, lies in a radially sealing manner against a side wall or inner wall of the recess and the function carrier is clamped axially against the body part.

The head-side skirt (perimeter wall) has a lateral surface tapering in the connecting direction, i.e., in the component direction. The skirt can extend downwards from a connection to the stem. The cone of the (closure) head lies in a tapering configuration within the conical cup of the function carrier. By means of the tapering skirt, as large a sealing surface as possible or a correspondingly large supporting surface for the application of the axial force can be provided on the conically running inner wall of the cup.

The skirt can extend counter to the connecting direction from the connecting point of the skirt to the stem. This design requires a skirt tapering in the connecting direction, wherein said skirt is then arranged within the cup and therefore lies against the inner wall of the cup. Since the skirt is therefore connected at its lower end with a closed surface to the stem, the drive structures, for example, can lie within the skirt which acts as a stopper in relation to the cup.

During the connecting operation, the head (closure head) also moves in the axial direction relative to the second component (body part) and therefore also relative to the first component (function carrier), as a result of which, after a rotation of the connecting element into a closed position, the skirt of the head lies in a radially sealing manner against the cone surface of the cup.

The holding structures are configured as lock arms or as radial rings which extend radially on the stem, which is connected rigidly, in particular integrally, to the head (closure head) of the connecting element. The aperture in the body part is adapted to the shape of the radial wings in such a manner that said wings can be passed through in a projection in a certain orientation. After the wings have been guided through the recess in the body part, the wings interlock against the body part, in particular at an angle of rotation of approximately 90°. For this purpose, the wings have a level over the direction of rotation that rises in the axial direction in order to increase the contact pressure as the rotation increases in the direction of the closed position. The rotation causes the (closure) head of the connecting element to be drawn into the cup such that, by means of the conical design of the cup and of the head, they lie against one another in such a manner that a radial seal arises circumferentially.

A minimum clamping force is provided by the overall thickness of function carrier and body part being coordinated with the distance between the head and holding structures in the closed position. The penetration depth of the head into the cup is taken into consideration here.

In one refinement of the connecting arrangement, the connecting element is formed in two parts and has a sleeve which is provided with a thread and which expands in a thread-bearing part, which is connected to the closure head, by rotation of the closure head in relation to the sleeve. The sleeve comprises an expanding element such that the sleeve is expanded by rotation of the head with respect to the sleeve. Expansion of the sleeve causes the function carrier and the body part, which lie between the head (closure head) and the expanding element of the sleeve, to be pressed against one another. By means of the configuration of the connecting element with an expanding element, the sleeve can be plugged through a hole present in the body and then tightened. The angle of rotation required for the fastening regularly exceeds 360°. A plurality of revolutions may even be necessary in order to reach the closed position.

Preferably, in this refinement, the sleeve and the function carrier are coordinated with one another in terms of their contour in such a manner that anti-twist protection arises. As a result, the connecting region of the body part, which is in particular a sheet-metal part, can be configured in a simple geometry. The function carrier, which is in particular a plastics part, here provides the contour for anti-twist protection of the sleeve, and therefore, when the head part is rotated, the sleeve does not rotate at the same time and the sleeve can be expanded. The function carrier is preferably likewise secured against twisting in relation to the body part. This can take place by contour adaptation or by a simple pin.

The sleeve expediently bears a central bolt which bears an external thread, wherein a stem adjoining the closure ahead of the connecting element is designed to be hollow-cylindrical and bears an internal thread. Additionally or alternatively, the bolt is surrounded by a hollow-cylindrical outer wall. The bolt is fixedly connected to the outer wall of the sleeve such that, in the installed state, the bolt moves in the direction of the head with the rotational movement of the head in the tightening direction.

In particular, the bolt is entrained in the axial direction until the outer wall lies in particular against the head and, upon further rotation in the tightening direction, the base of the sleeve is pulled further towards the head. This leads to the expanding elements of the sleeve expanding. The expanding element can be formed, for example, solely by a cylindrical outer wall which arches outward upon compression. In this way, the body part and the function carrier can be clamped between the head and the expanding element.

Upon rotation counter to the tightening direction, the expanding element is reset and the connection can be released. If the expanding element is formed by a hollow-cylindrical wall, the latter is stretched once more into its starting position upon rotation counter to the tightening direction.

According to a further preferred refinement, the function carrier can have a recess which is concentric with respect to the cup and is in the form of a circular cross section through which the connecting element can penetrate. The recess here has a slightly larger diameter than the outer diameter of the connecting element passing through the recess.

According to a further refinement, the head can have a latching structure located circumferentially, and therefore the latter, after latching, lies between the head and the function carrier. As a result, an inadvertent reverse rotation of the head is prevented.

In a further advantageous refinement, the cone of the cup and the sealing region of the skirt can be at the same angle. This ensures a sealing surface which is as large as possible.

According to a particularly preferred development of the invention, the tapering has different degrees of tapering over the lateral surface in the axial direction. Account can thereby be taken of the tolerances of the cup.

The advantages achieved by the invention consist in particular in that the connecting element can be simply produced by means of a single tool, preferably by injection molding (plastics injection molding), as a 10 plastics part. The head (closure head) of the connecting element preferably has drive structures permitting a form-fitting transmission of a torque.

In addition, no additional seal, preferably also no 2C component connecting element with an elastic sealing lip or the like, is required between the first component (carrier) and the connecting element. This is preferably achieved by the surface pressure between the first component (carrier) and the connecting element.

The sealing takes place solely via the pair of sealing surfaces of the connecting element and of the first component, preferably via the truncated cone shape of the closure head and the corresponding counter shape, i.e., the frusto-conical inner wall of the receptacle of the first component (carrier). It is also possible for only the closure head of the connecting element or only the inner wall of the receptacle or of the cup of the first component (carrier) to have the cone or truncated cone shape. In these embodiments, as well, an extensively sealing, simply producible and re-releasable connection is provided between the first component, in particular a function carrier, and the second component, in particular a body part.

By suitably elastic properties of the first component and/or of the connecting element and by the formation of the cone angles of the truncated cone shape or cone shape on the closure head of the connecting element or on the inner wall of the component-side receptacle (cup) for the closure head, reliable sealing arises between the components, in particular between the first component (carrier) and the connecting element. Additional water barriers mounted upstream and/or labyrinths can preferably be provided which prevent water from entering.

The seal between the connecting element and the component-side or carrier-side cup is preferably designed in such a manner that a tightness of more than 30 mm water column is achieved. The cone of the component-side cup and the sealing region of the closure-head-side skirt of the connecting element can advantageously be at the same angle. As large a sealing surface as possible is thereby achieved.

Other features which are considered as characteristic for the invention are set forth in the appended claims.

Although the invention is illustrated and described herein as being embodied in a connecting element and connecting arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Mutually corresponding parts and dimensions are provided with the same reference signs throughout the figures.

DETAILED DESCRIPTION OF THE INVENTION

Figure 1:
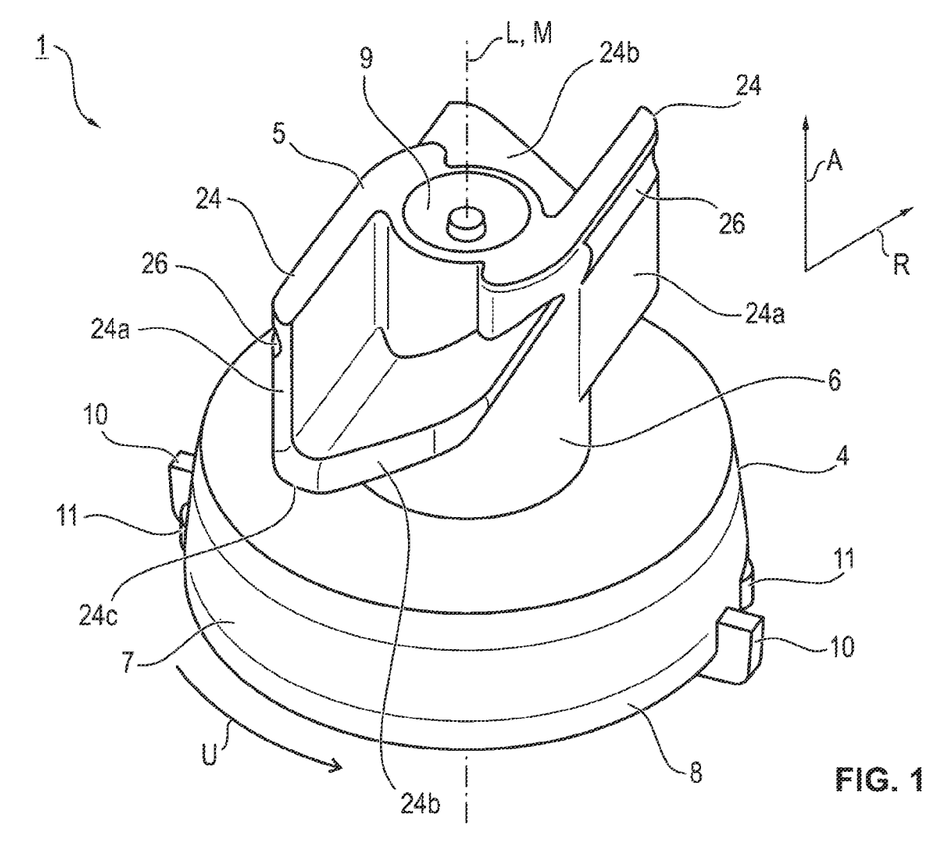
FIG. 1 is a perspective illustration showing a connecting element with a closure head (abutment collar) and with a closure foot (transverse lock) and also with a stem portion, looking at the rear side of the closure head.
Figure 2:
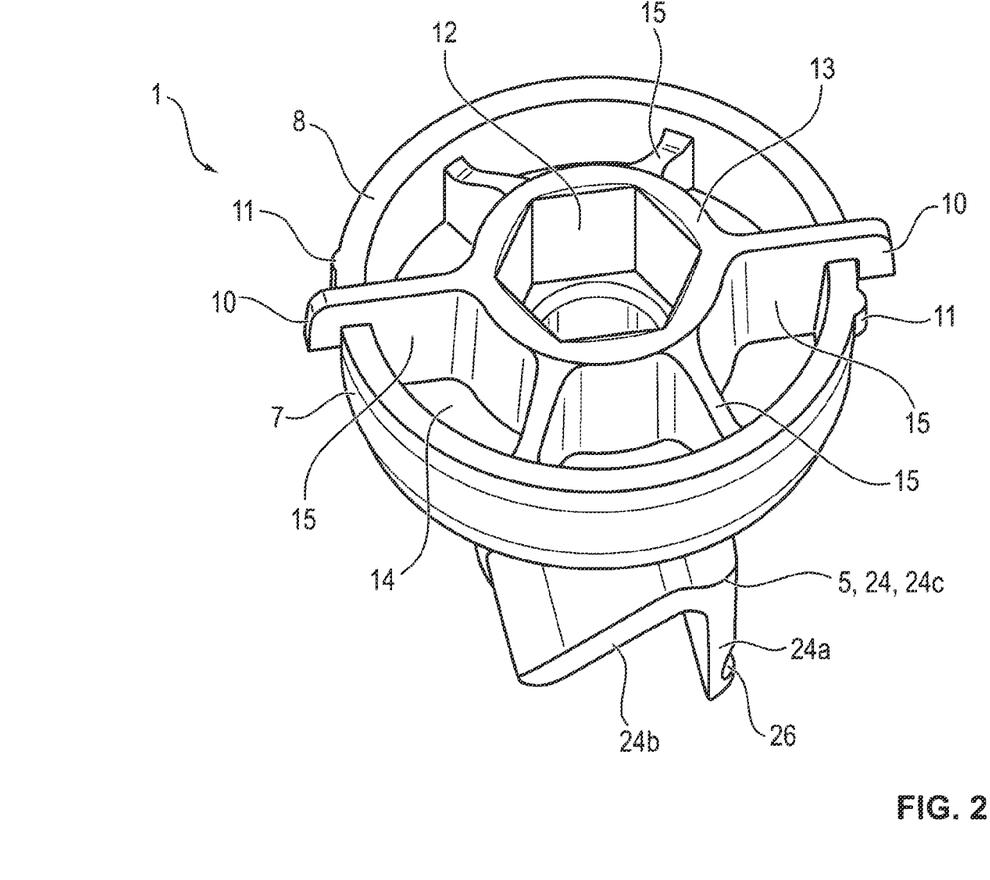
FIG. 2 is a perspective illustration showing the connecting element, looking at the upper side of the closure head.

Referring now to the figures of the drawing in detail and first, in particular, to FIGS. 1 and 2 thereof, there is shown a connecting element 1 that serves to mechanically connect at least two components 2, 3, in particular two components of a motor vehicle door, preferably a function carrier or carrier 2 for short and a further component 3 (FIG. 6), preferably a body part. The connecting element 1 has an abutment collar, referred to below as closure head or simply as head 4, for sealing abutment against the first component 2, a transverse lock, referred to below as closure foot 5, for bracing the components 2, 3 in a rotated final installation position, and a stem or stem portion 6 between the closure head 4 and the closure foot 5. The closure head 4 has a lateral or abutment surface tapering along the stem portion 6 toward the closure foot 5 as (abutment-collar-side) sealing surface 7.

In other words, the closure head 4 is frustoconical and has a perimeter wall or encircling skirt 6 which forms the sealing surface 7 tapering along the stem portion 6 towards the closure foot 5. The closure head 4 extends axially in the direction of the center axis M of the connecting element 1 or along the longitudinal axis L of the stem portion 6. The latter is designed as a hollow body with a stem foot 9, which is closed on the free end side or base side, at the stem end facing away from the closure head 4. The axial direction based on the longitudinal axis L of the stem and on the center axis M of the connecting component 1 is denoted by A in FIG. 1 and the radial direction is denoted there by R.

The connecting element 1 is a connecting component in the style of a quarter-turn fastener or quick-acting closure. The closure foot 5, suitably in helical form, is spaced apart axially from the closure head 4 along the stem portion 6 in the longitudinal direction L of the stem. The connecting element 1 with the closure head 4 with its sealing surface 7 and with the closure foot 5 and also with the stem portion 6 is a single-component plastics component (1C component).

In the exemplary embodiment, two web-like stop elements 10 are provided or are integrally formed on the closure head 4 and protrude radially over the closure head 4. A radial securing cam 11 is mounted upstream of each of the stop elements 10 in the circumferential direction U, the securing cam being integrally formed on the outer circumference of the closure head 4 in a manner offset axially with respect to the sealing surface 7 and protruding radially over the closure head 4. In addition, the connecting element 1 has, on or in the closure head 4, a tool-holder 12 for receiving a corresponding tool. In the exemplary embodiment, the tool holder 12 is designed in the form of a hexagon socket for receiving an Allen wrench as the tool. The stop elements 10 can also be provided at other positions on the connecting element 1.

Figure 4:
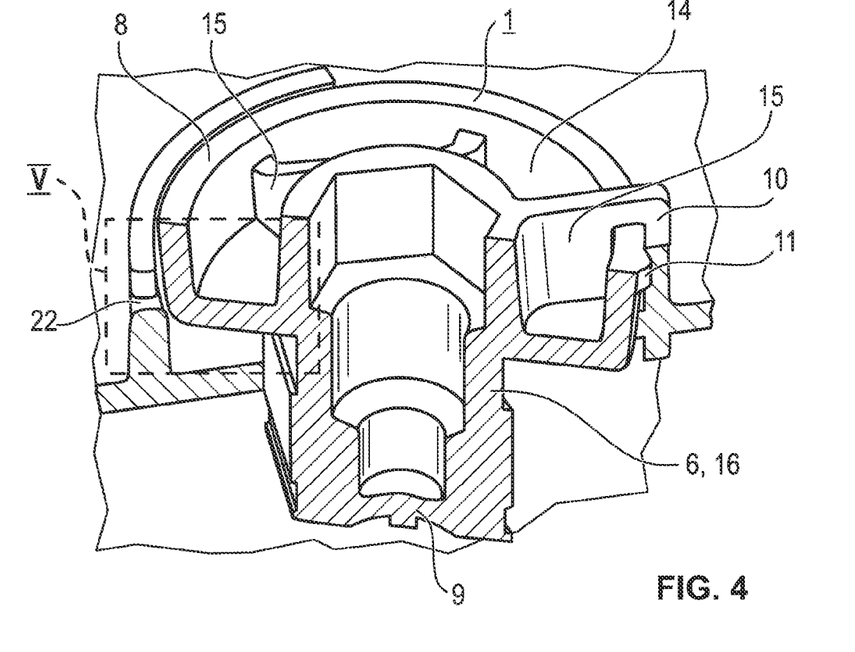
FIG. 4 is a perspective sectional illustration showing the connecting element in the passage opening of the first component (carrier)
Figure 5:
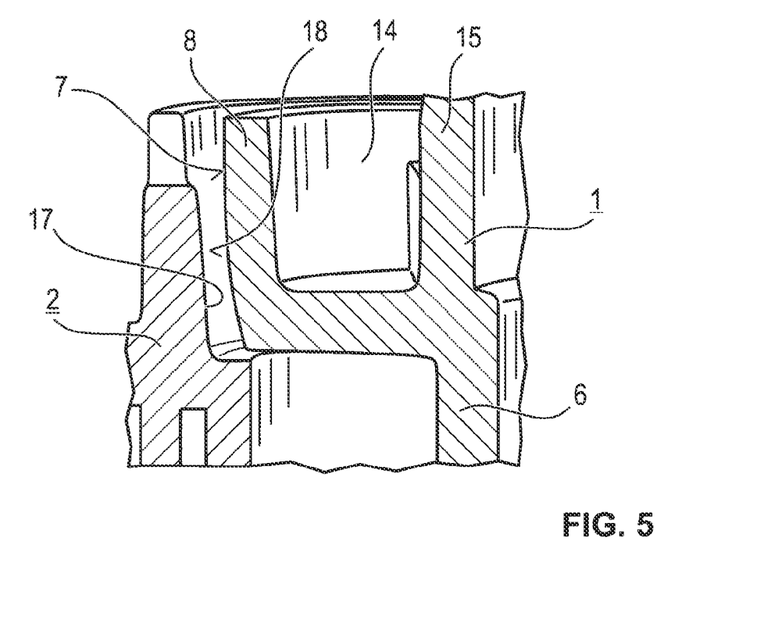
FIG. 5 shows an, in particular slightly rotated, detail V from FIG. 4.

As can also be seen in FIG. 4, between a wall 13 of the tool holder 12 and the perimeter wall 9 of the closure head 4, an annular space 14 is formed in which, in the exemplary embodiment, six inner struts 15 are formed running radially. Two diametrically opposite inner struts 15 each bear one of the stop elements 10, the stop elements protruding both radially and axially over the closure head 4. The clear width of the hollow or hollow-cylindrical stem portion 6 of the connecting element 1 decreases gradually from the closure head 4 toward the stem foot 16.

Figure 6:
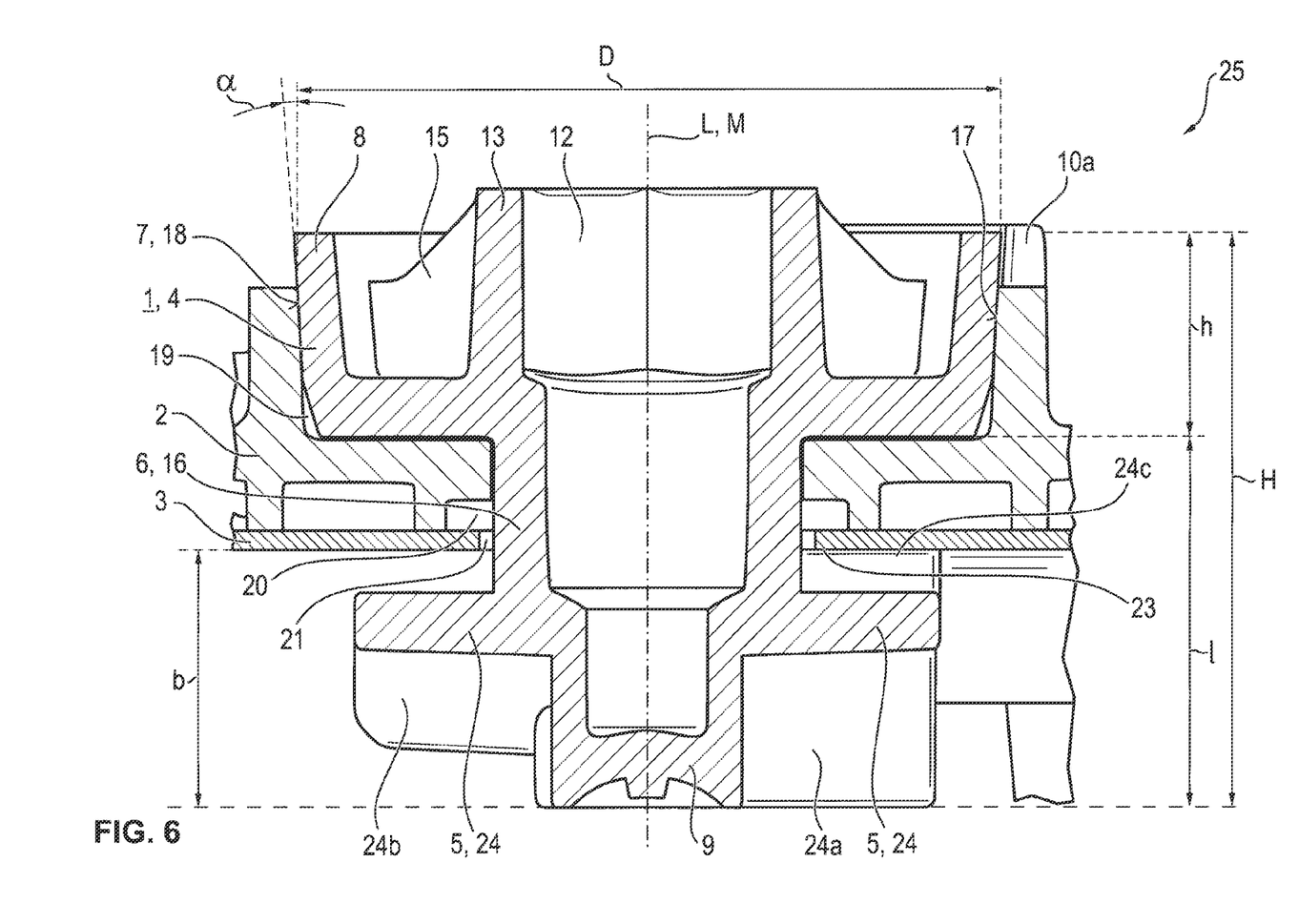
FIG. 6 is a sectional illustration showing a connecting arrangement with the connecting element in mutually aligned passage openings of two components to be connected.

In FIG. 6, the axial height of the closure head 4 is denoted by H, the axial height or length of the connecting element 1 by H, the diameter of the closure head 4 (abutment collar) by D, the axial height or length of the stem 16 of the connecting element 1 extending over the closure foot 5 by l, and the axial height or length of the closure foot (transverse lock) 5 by b. The axial height or length of the stem portion 6 extending between the closure head 4 and the closure foot 5 corresponds to the difference (l–b) between the axial height l of the stem and the axial height b of the closure foot 5.

Advantageously, the axial height h of the closure head 4 corresponds to between 30% and 40% of the axial height or length H of the connecting element 1 and between 50% and 60% of the axial height or length l of the stem 16. The axial height b of the closure foot 5 preferably corresponds to between 40% and 50% of the axial height or length H of the connecting element 1 and to between 65% and 75% of the axial height or length l of the stem 16.

Figure 3:
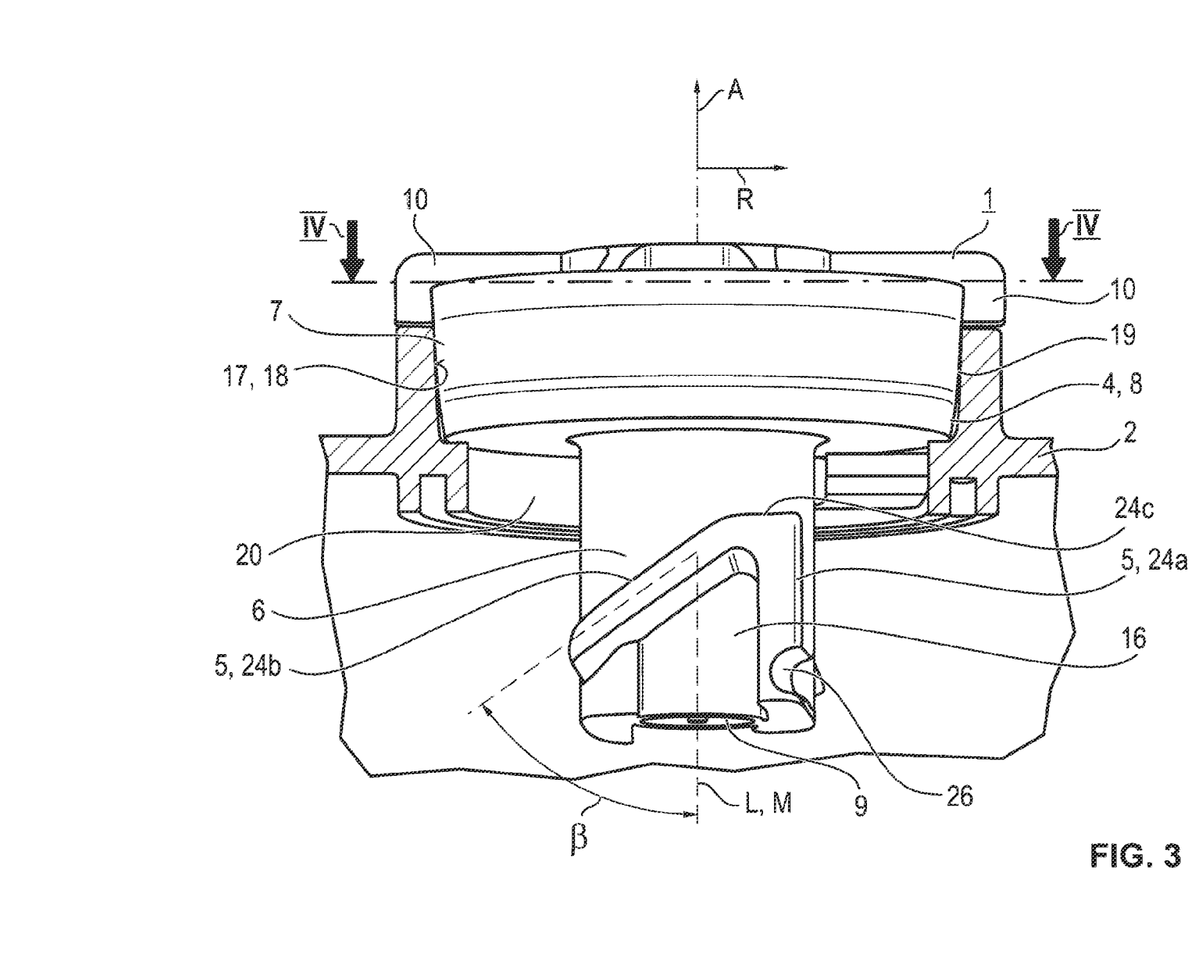
FIG. 3 is a perspective, partially sectioned illustration showing the connecting element in a passage opening of a first component (carrier)

As is apparent comparatively clearly from FIGS. 3 and 6, the closure head 4 has the form of a truncated cone. In other words, the closure head 4 has a perimeter wall 8 tapering toward the closure foot 5 and having the axial height h. The perimeter wall 9 forms the corresponding sealing surface 7 or has the latter.

The angle (cone angle) $\alpha$ illustrated in FIG. 6 is preferably greater than 1° and smaller than 20°. In particular, the angle $\alpha$ is between 2° and 15°, expediently $\alpha=(8\pm5°)$.

As is apparent from FIGS. 3 to 6, the first component 2 as mating surface to the frustoconical perimeter wall 8 of the closure head 4 of the connecting element 1 has a frustoconical inner wall or abutment wall 17 which can form a likewise frustoconical (component-side) sealing surface or abutment surface 18 or comprise the latter. The inner wall 17 is formed by and is located in a recess 19, also referred to below as cup, of the first component 2, the recess 19 receiving the closure head 4 at least over part of the axial height h thereof. In principle, instead of the frustoconical perimeter wall 8 of the closure head 4 of the connecting element 1, merely the inner wall or abutment wall 17 can also be formed frustoconically.

The perimeter wall 8 of the closure head 4 and the inner wall (abutment wall) 17 of the recess 19 of the first component 2 form a pair of sealing surfaces 7, 18. In other words, the perimeter wall 8 and the inner wall (abutment wall of the carrier) 17 form a pair of sealing surfaces in the form of a truncated cone. When the closure head 4 or the perimeter wall 8 thereof buts against the inner-circumferential inner wall 17 of the bead-like recess 19 of the first component (carrier) 2, a high degree of tightness (sealing) of the connecting element (1) and of the first component 2 is provided without additional, for example flexible and/or elastic sealing elements (sealing lip or the like). As illustrated in the figures, the sealing surfaces 7, 18 formed by the abutment-collar-side perimeter wall 8 and by the component-side inner wall 17, or the pair of sealing surfaces, are or is encircling.

The closure foot 5 and the stem 16 carrying the latter and with the stem portion 6 between the closure head 4 and the closure foot 5 are provided and designed for rotatably passing the connecting element 1 through corresponding passage openings (apertures) 20, 21 in the components 2, 3.

FIGS. 3 and 4 show the connecting element 1 in an installation or joining state in which the closure foot 5 has been plugged through the passage opening 20 of the first component 2 and the closure head 4 of the connecting element 1 sits in the recess 19 of the first component 2. The respective securing cam 11 snaps or engages in a corresponding securing groove 22 along the recess 19 of the first component 2.

In the installation state or joining state (final installation state) shown in FIG. 6, the connecting element 1, which is now also guided through the corresponding passage opening 21 of the second component 3, is further rotated in such a manner that the closure foot 5 engages behind the second component 3 in the region of an opening edge 23 of the passage opening 21. Owing to helical or wedge-shaped contours of the closure foot 5, during said rotational movement of the connecting element 1 an axial bracing force, i.e., acting in the direction of the center axis or longitudinal axis of the stem M or L, is produced. This leads to surface pressure of the closure-head-side perimeter wall 8 against the component-side inner wall 17 of the first component (carrier) 3 and therefore to surface pressure of the frustoconical pair of sealing surfaces 7, 18.

In the final installation state, the connecting element 1 is secured on the first component 2 by means of the stop elements 10 against further rotation and by means of the securing cams 11 against inadvertent reverse rotation and release. For this purpose, for the respective stop element 10, a corresponding stop contour 10a is provided on the first component 2.

The closure foot 5 has two diametrically opposite wings or lock arms 24, which run radially with respect to the stem portion 6 or to the stem axis L thereof, as holding structures.

The two components 2, 3 are thereby braced against one another in the final installation state between the closure head 4 and the closure foot 5. The lock arms 24 of the closure foot 5 have lock flanks 24a, 24b running in a V-shaped or wedge-shaped manner with respect to one another. A lock apex 24c connecting the lock flanks 24a and 24b faces the closure head 4.

One of the lock flanks 24a, 24b, here the lock flank denoted by 24a, runs parallel to the stem portion 6 or to the longitudinal axis L of the stem, while the other lock flank 24b runs obliquely or at an inclination at a wedge angle β with respect to the stem portion 6 or with respect to the longitudinal axis of the stem and center axis L, M (FIG. 2). In the exemplary embodiment, the wedge angle β is approx. 45°. The V-shaped design of the lock arms 24 is particularly advantageous in order to guide (draw) a component 3 in the form of a sheet metal component constantly in a threaded manner onto a component 2 in the form of a plastics carrier.

As can be seen in FIG. 1, the parallel and the oblique lock flanks 24a, 24b of the two locks arms 24 are each opposite one another. In other words, the parallel lock flank 24a of one of the lock arms 24 is opposite the oblique lock flank 24b of the other lock arm 24. By this means, the locking element 1 acts symmetrically in both directions of rotations.

The connecting arrangement 25 illustrated in FIG. 6 comprises the first and second components 2, 3, which have the respective passage openings 20 and 21, and also the connecting element 1. In the final installation position shown in FIG. 6, the connecting element 1 reaches through the axially aligned passage openings (apertures) 20, 21 of the first component 2 and of the second component 3 and is rotated from the angular insertion position shown in FIGS. 3 and 4 into an angular end position (final installation state) in order to produce the connection.

In the angular end position (final installation state) of the connecting arrangement 25 shown in FIG. 6, between the closure head 4 or its frustoconical sealing surface 7 of the perimeter wall 8 and the first component 2 or its frustoconical counter surface as complementary sealing surface 18 of the inner wall 17 of the recess 19, a reliably sealing pair of sealing surfaces and therefore secure sealing of the connecting element 1 on the first component (carrier) 2 is produced. Preferably, the perimeter wall 8 or its encircling sealing surface 7 of the closure head 4 and/or the inner wall 17 or its encircling sealing surface 18 of the inner wall 17 do not have any roughness in the recess 19 of the first component (carrier) 2.

Figure 7:
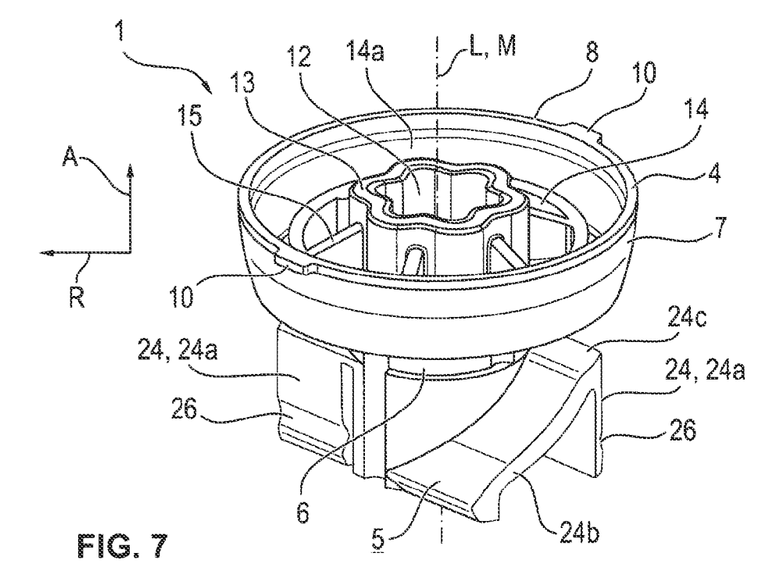
FIG. 7 is a perspective illustration showing a further embodiment of the connecting element looking at the upper side of the closure head.
Figure 8:
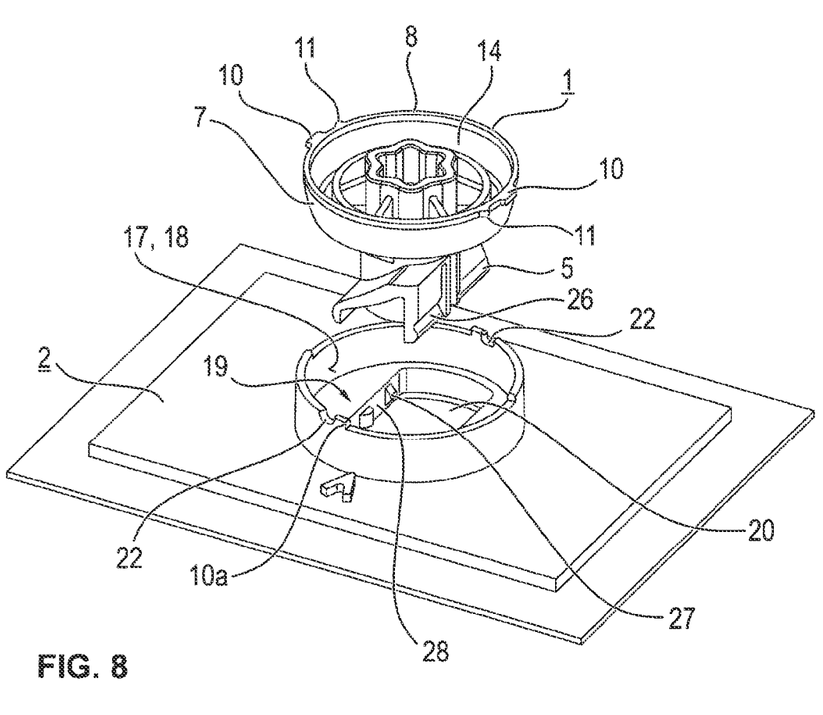
FIG. 8 is an exploded illustration of the connecting element according to FIG. 7 in a position above a passage opening in the first component (carrier)
Figure 10:
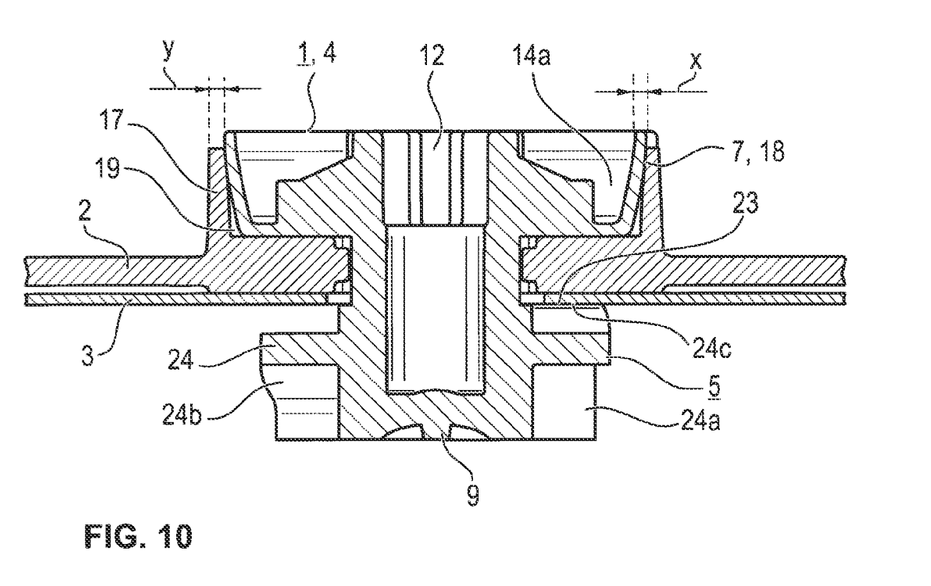
FIG. 10 is a sectional illustration showing the connecting arrangement with the connecting element according to FIG. 7 in the mutually aligned passage openings of the components in the final installation state (final installation position)

The connecting element 1 shown in FIG. 7 for the mechanical connection of the components 2, 3 differs from that of FIGS. 1 and 2 essentially in that the closure head 4 as abutment collar for sealing abutment against the first component 2 has a comparatively pronounced bowl or pot shape and two concentric annular spaces 14, 14a, in the radially inner annular space 14a of which the inner struts 15 are in turn formed. The tool holder 12 is designed here as a hexalobular socket. The closure foot (transverse lock) 5 in turn has two diametrically opposite lock arms 24 which run radially with respect to the stem portion 6 (stem axis L) and each have a lock flank 24a or 24b running parallel and obliquely with respect to the longitudinal axis L of the stem. With said lock arms, the two components 2, 3 are braced against one another in the final installation state between the closure head 4 and the closure foot 5 (FIG. 10).

The connecting element 1 with the closure head 4 with its sealing surface 7 and with the closure foot 5 and also with the stem portion 6 is likewise preferably a single-component plastics component (1C component). Also in this embodiment, the closure head 4 has, as sealing surface 7, a lateral surface or abutment surface tapering frustoconically along the stem portion 6 toward the closure foot 5.

As can also be seen in FIG. 2, the stop elements 10, which are integrally formed here on the perimeter wall 8 of the closure head 4, extend in turn radially. In addition, the securing cams 11 which are likewise integrally formed on the perimeter wall 8 of the closure head 4, are mounted upstream of the stop elements 10 in the circumferential direction U and are oriented radially can be seen, said securing cams latching in the final installation state into the corresponding securing grooves 22 of the recess 19 of the first component 2.

In this embodiment, the first component 2 as mating surface to the frustoconical perimeter wall 8 of the closure 84 of the connecting element 1 has a cylindrical inner wall or abutment wall 17 with a correspondingly cylindrical sealing surface or abutment surface 18 of the recess 19 of the first component 2, the recess receiving the closure head 4 over part of its axial height h. The perimeter wall 8 of the closure head 4 and the inner wall (abutment wall) 17 of the recess 19 of the first component 2 in turn form a pair of sealing surfaces 7, 18.

Figure 9:
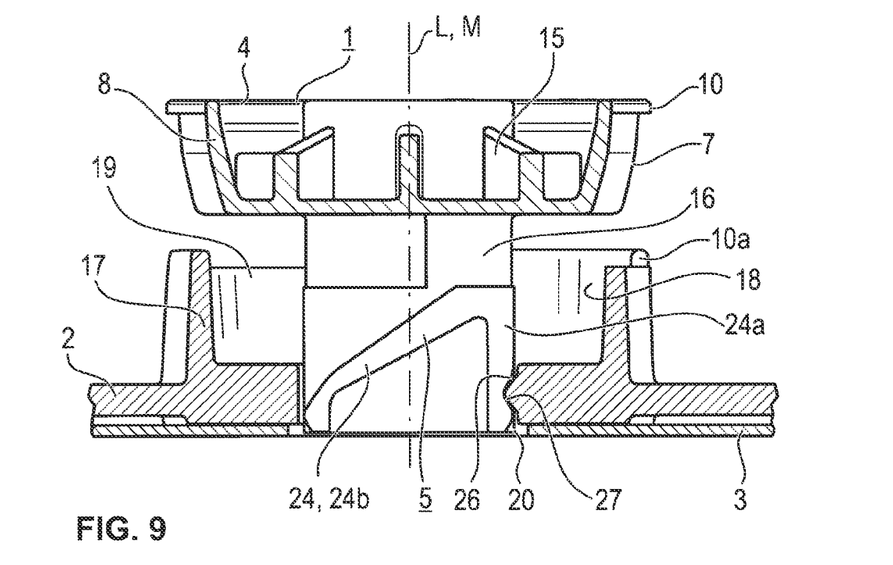
FIG. 9 is a perspective, partially sectioned illustration according to FIG. 3, showing the connecting element according to FIG. 7 in a latched preassembly position in the passage opening of the first component.

As is apparent from FIG. 9, in a first installation state or joining state (preassembly state), the connecting element 1 is located in the passage opening 20 of the first component 2 and is held captively there as a result of a rotation (twisting) of the connecting element 1. For this purpose, in the respective lock arm 24, and therein its lock flank 24a which is parallel to the longitudinal axis L of the stem, a joining element 26 is provided in the form of a radial groove in which a latching element 27 which is in the form of latching cam and is provided in the passage opening 20 of the first component 2 engages. Said latching element is integrally formed on at least one of two rectilinear parallel walls 28 of the passage opening 20.

In the installation state or joining state (final installation state) shown in FIG. 10, the connecting element 1 which is guided by the corresponding passage opening 21 of the second component 3, the passage opening 21 being axially aligned with the passage opening 20 of the first component 2, twisted further until the closure foot 5 engages in a force-fitting manner behind the second component 3 in the region of the opening edge 23 of the passage opening 21. In the process, the lock apex 24c of one of the lock arms 24 of the closure foot 5 is pressed against the second component 3. The closure head 4 of the connecting element 1 lies in the recess 19 of the first component 2, and the respective securing cam 11 engages in the corresponding securing groove 22 of the first component 2. In the final installation state, the connecting element 1 is secured on the first component 2 by means of the stop elements 10 against further twisting and by means of the securing cams 11 against inadvertent reverse rotation and release.

During said rotational movement of the connecting element 1, the axially acting bracing force leads to the closure head 4 being pressed into the component-side recess 19. The resultant surface pressure of the closure head 4 in the recess 19 of the first component 2 leads to a corresponding (radial) deformation of the closure-head-side perimeter wall 8 and/or of the component-side, here cylindrical, inner wall 17 of the first component (carrier) 3. For this purpose, the wall thickness x, y of the closure-head-side perimeter wall 8 or of the component-side inner wall 17 has correspondingly thin dimensions.

Figure 11:
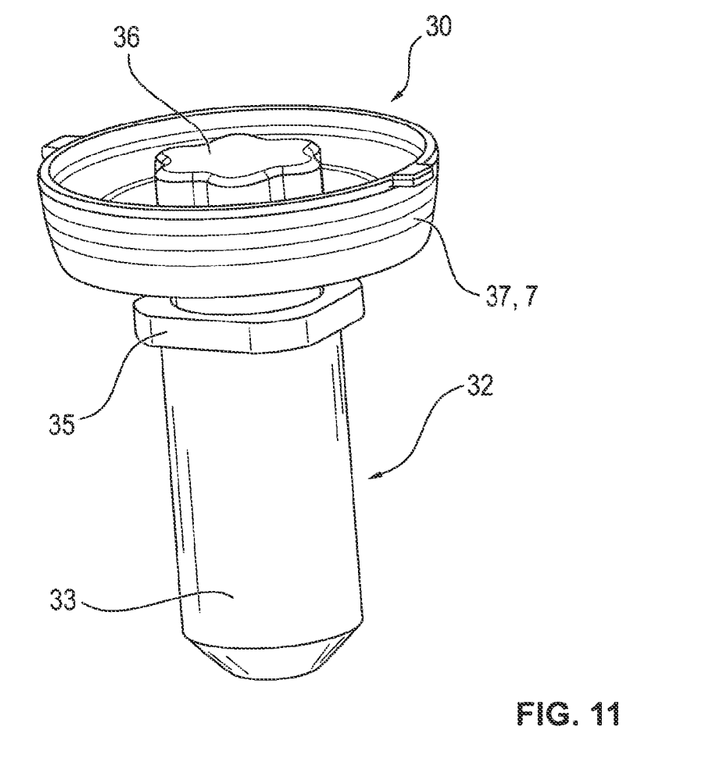
FIG. 11 is a perspective view of a further embodiment of a connecting element.
Figure 12:
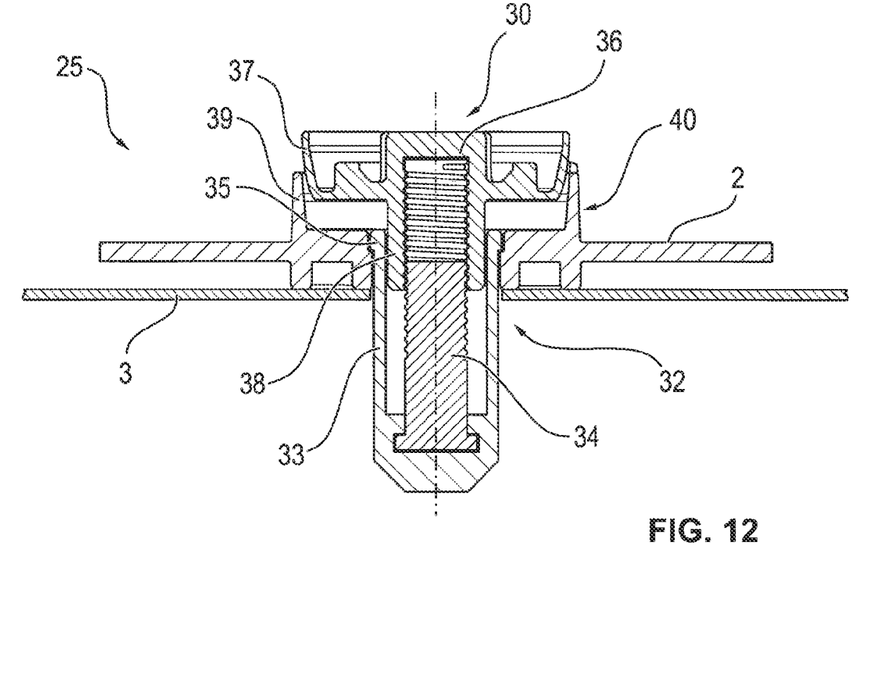
FIG. 12 is a sectional view of the connecting arrangement or module arrangement in a preassembled position of the connecting element according to FIG. 11.
Figure 13:
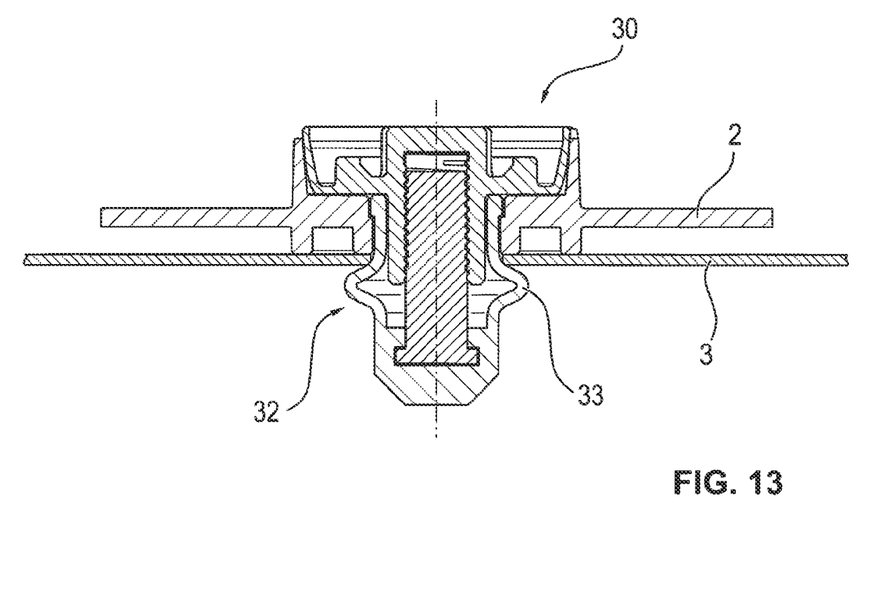
FIG. 13 is a sectional view showing the connecting arrangement or module arrangement according to FIG. 12 in a finally mounted position of the connecting element.

FIGS. 11 to 13 show an alternative embodiment of the connecting element 1 and of the latter in the connecting arrangement or module arrangement with a carrier (function carrier) as first component 2 and a body part as second component 3 in a preliminary and in a final installation position of the connecting element.

The connecting element 30 of this design, which is illustrated perspectively in FIG. 11 and in a sectional view in FIG. 2, is in two parts and comprises a part with a head (closure head) 31 and an expanding element in the form of a sleeve 32. The sleeve 32 has a substantially hollow-cylindrical outer wall 33. Concentrically within the outer wall, the sleeve 32 has a bolt 34 which bears an external thread. At the upper end of the sleeve 32, the outer wall 33 has a form-fitting structure 35 which is inserted into a corresponding recess in the function carrier 2 such that a relative rotation of the sleeve 32 with respect to the functional carrier 2 is prevented. The head 31 of the connecting element has an outer drive 36 which is surrounded by the perimeter wall or skirt 37 with the sealing surface 7 and in principle can also be designed as an inner drive corresponding to the tool holder 12 according to FIG. 2.

That part of the connecting element 30 which has the closure head (head) 31 has a hollow-cylindrical stem 38 which is fixedly connected to the head 31 and which has an internal thread corresponding to the external thread of the bolt 34. The stem 38 can therefore be screwed to the bolt 34 of the sleeve 32. During rotation of the head 31 in the tightening direction of rotation, the head 31 and the sleeve 32 are moved with respect to one another.

As illustrated in FIG. 13, as the rotation progresses, the outer wall 33 of the sleeve 32 is compressed and bulges radially such that an expanding effect occurs. The outer wall 33 is braced against the body part as the second component 3, with the skirt 37 of the head 31 being placed against the wall 39 of the cup 40 of the function carrier as the first component 2. An improved sealing action is therefore achieved between the function carrier 2 and the connecting element 30. If the head 31 is now rotated counter to the tightening direction, the outer wall 33 of the sleeve 32 is stretched, and the connection can be released.

In summary, the invention relates to a connecting element 1, preferably made from one material component, for the mechanical connection of at least two components 2, 3, having a closure head 4 and a closure foot 5 for bracing the second component 3 against the first component 2 in a final installation position, and also a stem portion 6, wherein the closure head 4 has a sealing surface 7, which extends axially (in the longitudinal direction L of the stem), for sealing abutment against a sealing surface 18 of a recess 19 of the first component 2. A module arrangement or connecting arrangement according to the invention comprises a first component 2 and at least one second component 3, and also such a connecting element 1 or 30.

The claimed invention nis not restricted to the exemplary embodiment described above. On the contrary, it is also possible for other variants of the invention to be derived therefrom within the scope of the disclosed claims by a person skilled in the art, without departing from the subject matter of the claimed invention. In particular, all individual features described in conjunction with the various exemplary embodiments may furthermore also be combined with one another in some other way within the scope of the disclosed claims, without departing from the subject matter of the claimed invention.

In addition, the described solution can be used not only in the specifically illustrated application, but also in a similar embodiment in other motor vehicle applications, for example in door systems and tailgate systems, in power windows, in vehicle locks, in adjustable seat systems and interior systems, and in electric drives, controllers, sensors and the arrangement thereof in the vehicle.

The following is a summary list of reference numerals and the corresponding structure used in the above description of the invention:

1 Connecting element
  2 First component/function carrier
  3 Second component/body part
  4 Closure head/abutment collar
  5 Closure foot/transverse lock
  6 Stem/stem portion, or shaft
  7 (Abutment-collar-side) sealing/abutment surface
  8 Perimeter wall/skirt
  9 Stem foot
  10 Stop element
  10a Stop contour
  11 Securing cam
  12 Tool holder
  13 Wall
  14, 14a Annular space
  15 Inner strut
  16 Stem
  17 Inner wall/abutment wall
  18 (Component-side) sealing/abutment surface
  19 Recess/cup
  20, 21 Passage opening/aperture
  22 Securing groove
  23 Opening edge
  24 Lock arm/wing
  24a Parallel lock flank
  24b Oblique lock flank
  24c Lock apex
  25 Connecting arrangement
  26 Joining element/radial groove
  27 Latching element/latching cam
  28 Parallel wall
  30 Connecting element
  31 Closure head
  32 Sleeve
  33 Outer wall
  34 Bolt
  35 Form-fitting structure
  36 Outer drive
  37 Perimeter wall/skirt
  38 Stem
  39 Wall
  40 Cup
  A Axial direction
  D Diameter of the abutment collar
  H Axial height of the connecting element
  L Longitudinal axis of the stem
  M Center axis
  R Radial direction
  U Circumferential direction
  b Axial height of the transverse lock
  h Axial height of the abutment collar
  l Axial height of the stem
  x, y Wall thickness
  α Cone angle
  β Wedge angle

The invention claimed is:

1. A connecting element for mechanically connecting at least two components, the connecting element comprising:
  a closure head for abutment against a first component;

a closure foot for abutment against a second component and for bracing the second component against the first component in a rotated final installation position of the connecting element;

a stem portion extending between said closure head and said closure foot, wherein said closure foot is axially spaced apart from said closure head in a longitudinal direction of said stem portion;

said closure head being frustoconical with a sealing surface tapering towards said closure foot and extending in a longitudinal direction of said stem portion, for sealing abutment against a corresponding sealing surface of a recess formed in the first component; and wherein:

said closure head is formed with an annular space and radial inner struts formed in said annular space;

said closure head has a perimeter wall and is configured with said perimeter wall to be radially elastic;

said closure foot is formed with lock arms extending radially with respect to the longitudinal axis of said stem portion and having lock flanks running V-shaped or wedge-shaped with respect to one another and a lock apex connecting said lock flanks and facing said closure head;

one of said lock flanks of at least one of said lock arms runs parallel to the longitudinal axis of said stem portion and another one or said lock flanks of said lock arm runs at an angle obliquely with respect to the longitudinal axis of said stem portion; and said closure head with said sealing surface, said closure foot, and said stem portion together form a single-component plastics component.

2. The connecting element according to claim 1, wherein said stem portion is a hollow body.

3. The connecting element according to claim 2, wherein said hollow body is closed off on a free end side by a stem foot.

4. The connecting element according to claim 1, wherein said closure foot is formed with a joining element for releasably latching to a corresponding latching element of the first component.

5. The connecting element according to claim 1, wherein said lock flank, which runs parallel to the longitudinal axis of said stem portion, of said one lock arm is arranged opposite said lock flank, which runs obliquely with respect to the longitudinal axis of said stem portion, of the other said lock arm.

6. The connecting element according to claim 1, further comprising at least one of a stop element or a securing cam.

7. The connecting element according to claim 6, wherein said at least one stop element or securing cam is formed on said closure head.

8. A connecting arrangement, comprising:

a first component having a recess formed therein with a sealing surface;

a second component each being formed with a passage opening; and a connecting element, having:

a closure head for abutment against said first component;

a closure foot for abutment against said second component and for bracing said second component against said first component in a rotated final installation position of said connecting element;

a stem portion extending between said closure head and said closure foot and axially spacing said closure head and said closure foot apart from one another in the longitudinal direction of said stem portion;

said closure head having a sealing surface extending in the longitudinal direction of said stem portion, for sealing abutment against said sealing surface of said recess formed in said first component;

wherein, in a preassembly position, said connecting element is held on said first component and said closure foot is located in said passage opening of said first component;

wherein said closure head has a perimeter wall and is configured with said perimeter wall to be radially elastic;

wherein, in a final installation position, with said passage openings axially aligned with one another, said connecting element reaches through said passage openings of said first and second components and a connection between said first and second components is produced when said connecting element is rotated from an angular insertion position into an angular end position;

wherein a pair of sealing surfaces is formed in said first component between said connecting element and said first component, with said sealing surface of said closure head sealing against said sealing surface in said recess of said first component;

wherein said closure head is formed with an annular space and radial inner struts formed in said annular space;

wherein said closure foot is formed with lock arms extending radially with respect to the longitudinal axis of said stem portion and having lock flanks running V-shaped or wedge-shaped with respect to one another and a lock apex connecting said lock flanks and facing said closure head;

wherein one of said lock flanks of at least one of said lock arms runs parallel to the longitudinal axis of said stem portion and another one or said lock flanks of said lock arm runs at an angle obliquely with respect to the longitudinal axis of said stem portion; and wherein said closure head with said sealing surface, said closure foot, and said stem portion together form a single-component plastics component.

9. The connecting arrangement according to claim 8, wherein at least one of said sealing surface of said closure head or said sealing surface of said recess is cone-shaped or conical.

10. The connecting arrangement according to claim 8, wherein said connecting element is releasably latched in the preassembly position to said closure foot and, by way of said passage opening, to said first component by way of corresponding joining and latching elements.

* * * * *